United States Patent [19]

Raven

[11] Patent Number: 4,638,315
[45] Date of Patent: Jan. 20, 1987

[54] ROTOR TIP SYNTHETIC APERTURE RADAR

[75] Inventor: Robert S. Raven, Catonsville, Md.

[73] Assignee: Westinghouse Electric Corp., Pittsburgh, Pa.

[21] Appl. No.: 622,516

[22] Filed: Jun. 20, 1984

[51] Int. Cl.[4] .................................................. G01S 13/90
[52] U.S. Cl. ...................................................... 342/5
[58] Field of Search .................. 343/5 HE, 17, 5 CM, 343/367, 418, 402, 405; 455/71

[56] References Cited

U.S. PATENT DOCUMENTS

| | | | |
|---|---|---|---|
| 3,182,131 | 5/1965 | Barnes | 179/15 |
| 3,317,909 | 4/1967 | Waetjen | 343/418 X |
| 3,325,736 | 6/1967 | Waetjen | 325/65 |
| 3,428,898 | 2/1969 | Jacobsen et al. | 455/71 X |
| 3,450,842 | 6/1969 | Lipke | 455/71 X |
| 3,611,376 | 10/1971 | Gutleber | 343/5 HE X |
| 3,942,115 | 3/1976 | Wolejsza, Jr. | 455/71 X |

OTHER PUBLICATIONS

R. F. C. Vessot and M. W. Levine, "Gravitazione Sperimentale," Accademia Nazioinale del Lincei, Rome, 1977, p. 371.

Primary Examiner—T. H. Tubbesing
Assistant Examiner—Mark Hellner
Attorney, Agent, or Firm—W. G. Sutcliff

[57] ABSTRACT

A rotor tip synthetic aperture radar is described including a rotor operable to rotate, a radar receiver positioned in the rotor and for relaying received signals to a second position such as the cab of a helicopter. A radar transmitter and receiver located within the second location for transmitting radar signals towards a target and for receiving target reflected signals relayed from the rotor tip. The doppler frequency shift imposed on the relayed target reflected signals is cancelled by generating a pilot signal at a predetermined frequency and transmitting the pilot signal to the rotor tip which has a receiver for receiving the pilot signal and for relaying the pilot signal back to the second location and frequency multipliers and mixers for generating a first order doppler frequency shift signal appropriately scaled to cancel the doppler frequency shift signal of the target reflected signals when the two are subtracted in a mixer.

11 Claims, 6 Drawing Figures

ROTOR TIP SYNTHETIC APERTURE RADAR

The present invention was made in the course of a contract on behalf of the U.S. Government, and the Government has rights in this invention.

BACKGROUND OF THE INVENTION

1. Field of the Invention

This invention relates to bistatic rotor tip synthetic aperture radars and more particularly to a relay link for transferring wide band information to or from a moving rotor tip and a second location wherein the relative motion provides a doppler shift to the wide band information requiring compensation.

2. Description of the Prior Art

Rotor tip synthetic aperture radar (SAR) relates to radar mapping and surveillance systems in which transmit and/or receive apertures on a rotating radial arm utilize their motion to trace out long synthetic apertures in space from which radar signals can be sequentially transmitted and/or received so as to produce very fine angular resolution normal to the axis of rotation. Applications may be to helicopter rotors for navigation, obstacle avoidance, target detection, and other mapping functions and to fixed rotating radial arm towers for radar surveillance and ground testing and demonstration of synthetic aperture radar functions. Radar configurations may be monostatic with both transmission and reception from the rotating aperture or bistatic with only transmission or reception from the rotating aperture with the corresponding transmission or reception function performed by a fixed or non-rotating aperture.

One embodiment of a rotor tip SAR configuration may involve a radiating and/or receiving aperture at the tip of the radial arm, wave guide or coaxial transmission line down the arm, and microwave rotating joints through the arm rotation mechanism to the radar transmitter/receiver equipment at a fixed or non-rotating location. In applications to helicopters, especially, incorporation of rotating microwave joints in the transmission line down the blade or radial arm, may be constrained by considerations of flight performance and safety, and impose difficult and costly mechanical design problems. In addition, the long transmission line down the radial arm may impose a substantial loss in the signal level.

In communication systems where the transmitter is moving relative to the receiver, a doppler frequency shift according to equation 1 is observed.

$$f_D = V f_c / C \quad (1)$$

where $f_D$ = the doppler frequency shift, V represents the relative frequency between the transmitter and receiving stations, $f_c$ represents the frequency of the signal coupling the stations and C represents the velocity of light. Methods to compensate for the doppler frequency shift in communication systems have been described such as, for example, in U.S. Pat. No. 3,182,131, which issued on May 4, 1965 to R. R. Barnes. In U.S. Pat. No. 3,182,131, a pilot signal source having a predetermined frequency such as 62 kilohertz is superimposed on a carrier signal of 6 gigahertz along with information in the range from 562 kilohertz to 1298 kilohertz and transmitted to a receiving station. The receiving station has a local oscillator which is used to remove the carrier signal of 6 gigahertz. The pilot signal and information signals pass through respective filters. The pilot signal as received with the doppler frequency shift is multiplied by a predetermined amount to provide the doppler frequency shift of the information signals in the band. The doppler frequency shift is combined with a predetermined frequency from an oscillator in a mixer, which is presented to a second mixer, where the doppler frequency shift for the center of the predetermined channel is subtracted from the signals in the predetermined band, and thereby provides the information with a reduced frequency shift which is centered about the midpoint of the predetermined frequency band. In U.S. Pat. No. 3,182,131, the pilot signal travels with the information signal superimposed on a carrier signal.

A doppler cancellation scheme is described in U.S. Pat. No. 3,325,736 wherein a signal is transmitted from a first station and received by a second station wherein it is processed to provide a signal with the frequency shift subtracted therefrom. The signal is then retransmitted from the second station to the first station wherein the doppler frequency shift added upon reception provides a signal where the first order of doppler frequency shift cancels. In U.S. Pat. No. 3,325,736, the transmitted and retransmitted frequencies may be sufficiently separated to permit continuous operation without feedback from the transmitting antenna to the receiving antenna of the same station. As shown in the drawing, each communication station must generate a predetermined frequency with respect to each other for proper operation.

In U.S. Pat. No. 3,450,842, a doppler frequency spread correction device is described which adds a doppler frequency to the base frequency.

It is therefore desirable to provide a relay link having one station in the rotor tip, and a second station mounted in a convenient structure, such as on the cab of a helicopter or on the supporting structure of the rotor for relaying radar related information from the rotor tip which may, for example, contain a receiver, to the cab of a helicopter which may, for example, contain a transmitter and signal processing equipment for processing a received signal.

It is further desirable to provide compensation for doppler frequency shifts arising from the relative motion of the first and second stations.

It is further desirable to transmit an auxiliary reference signal or pilot signal from the cab to the rotor tip and back to the cab where it may be used to cancel the one-way doppler frequency shift imposed on the radar data transferred from the rotor tip to the cab.

It is further desirable to phase lock the pilot signal with the radar signal being transmitted.

It is further desirable to offset in frequency the pilot signal being retransmitted at the rotor tip to the cab to facilitate simultaneous transmission and reception at both the cab and the rotor tip.

SUMMARY OF THE INVENTION

In accordance with the present invention, an apparatus and method for operating a bistatic rotor tip synthetic aperture radar is described comprising a rotor operable to rotate, a first receiver positioned at a first location in said rotor for receiving target reflected microwave signals, a transmitter positioned at a second location including means for generating and transmitting microwave signals towards a target. The first receiver includes means for amplifying the received microwave signals and for retransmitting the amplified microwave signals to a second receiver positioned at the second location. The second receiver includes means for extracting information from the amplified microwave signals, and first means for generating a pilot signal having a first predetermined frequency positioned at the second location and for transmitting the pilot signal to a second means at the first location for receiving said pilot signal, multiplying its frequency and retransmitting the multiplied pilot signal to the second location. Third means are provided at the second location for receiving and multiplying the frequency of the received pilot signal to provide a first signal, and fourth means for mixing the first signal with a second predetermined frequency to provide a second signal, and fifth means for mixing the second signal with the amplified microwave signals received by the second receiver to cancel first order doppler frequency shifts of the amplified microwave signals in passing from the first location to the second location.

DESCRIPTION OF THE PREFERRED EMBODIMENT

Figure 1:
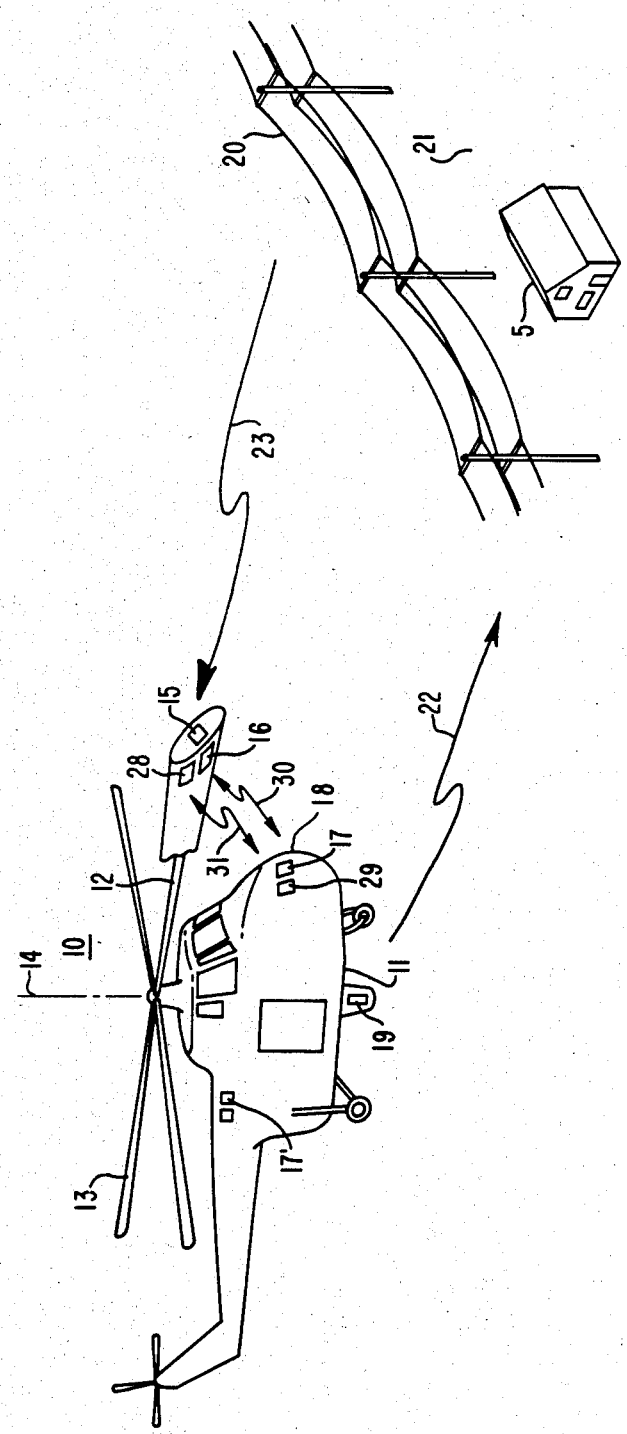
FIG. 1 is a diagram showing a helicopter with a bistatic rotor tip synthetic aperture radar.

Referring to the drawings, and in particular to FIG. 1, a bistatic rotor tip synthetic aperture radar 10 is shown implemented on a helicopter 11. Helicopter 11 has a rotor or blades 12 and 13 which rotate around the axis 14. Rotor or blades 12 and 13 are typical helicopter blades except that the tip of blade 12 has been modified to include certain electronic equipment. The tip of blade 12 may be removable for inserting electronic equipment in the removable portion. For example, as shown in FIG. 1, the tip of blade 12 has been modified to include antenna 15 which functions to receive target reflected radar signals, and antenna 16 which functions to relay target reflected radar signals to antenna 17 mounted on helicopter cab 18. Antenna 19 mounted below helicopter cab 18 functions to emit radar signals in a predetermined direction with a predetermined beam width. Antenna 19 functions to transmit radar signals along a path 22 to a reflecting target such as structure 5, terrain features 20 and the ground 21, and to receive target reflected signals along a path to antenna 15, such as shown by arrow 23.

Figure 2:
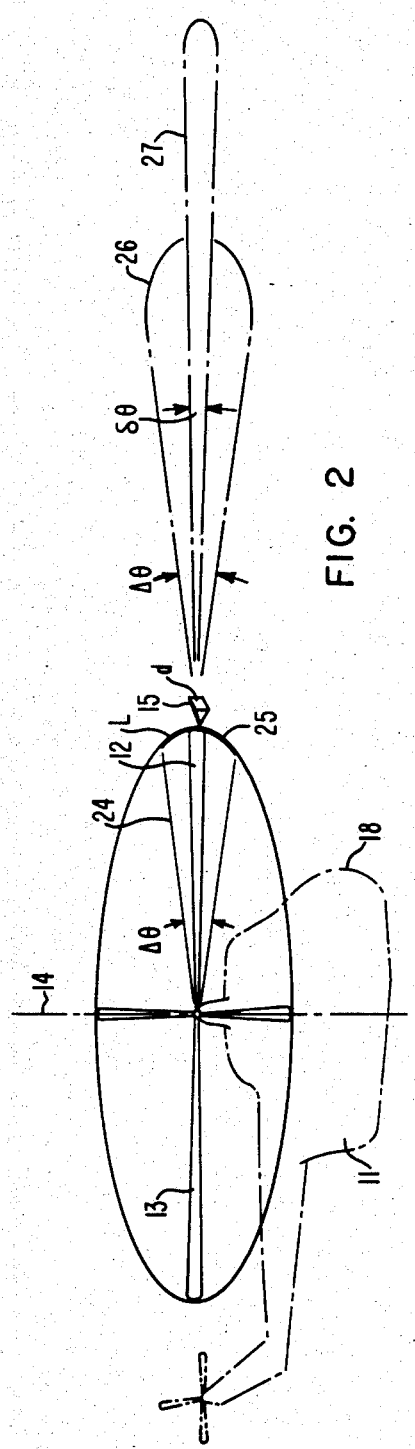
FIG. 2 is a diagram of a rotor moving to form a synthetic aperture, real aperture, synthetic beam width and real beam width.

In operation of the rotor tip synthetic aperture radar 10, rotor or blades 12 and 13 are rotating about axis 14. Referring to FIG. 2, a schematic diagram shows rotor or blades 12 and 13 rotating about axis 14. Antenna 15 mounted in rotor tip 12 has a predetermined aperture d dependent upon the size of antenna 15. Antenna 15 moves in an arc having a radius r shown by arrow 24, and over a predetermined time increment, rotor tip 12 moves through an angle $\Delta\theta$ shown in FIG. 2. Rotor tip 12 traverses an arc 25 having a length L in travelling the angular distance of $\Delta\theta$. Antenna 15 provides a real aperture d and a synthetic aperture L. Antenna 15 having an aperture d may have a beam width $\Delta\theta$ shown by reference line 26, where $\Delta\theta$ is proportional to $\lambda/d$, where $\lambda$ is the wavelength of the target received signals. Synthetic aperture L provides a beam width $\delta\theta$ shown by reference line 27 which is proportional to $\lambda/L$. By utilizing the geometry of the rotor, L is equal to $r\Delta\theta$ which is equal to $\lambda r/d$. By substituting this relationship into the relationship for $\delta\theta$, $\delta\theta$ is proportional to $d/r$.

Figure 3:
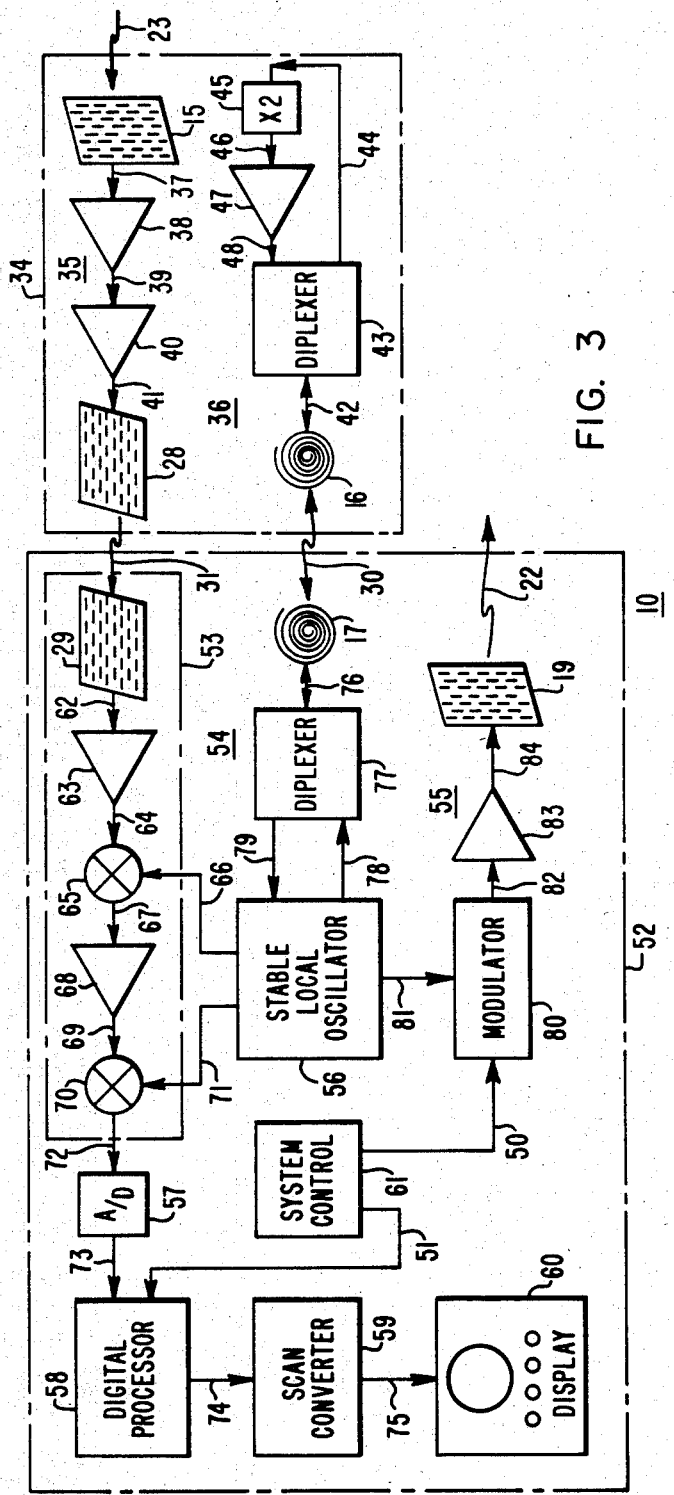
FIG. 3 is a schematic diagram of one embodiment of the invention.

FIG. 3 is a schematic diagram of rotor tip synthetic aperture radar 10. In FIG. 3, like references are used for functions corresponding to the apparatus of FIG. 1. Rotor tip elements 34 positioned in the tip of rotor 12 includes a receiver 35 for receiving target reflected microwave signals and a pilot signal receiver and transmitter 36. Receiver 35 includes antenna 15 having a predetermined aperture d for receiving signals such as shown by arrow 23 which are coupled over line 37 to a low noise amplifier 38. The output of low noise amplifier 38 is coupled over line 39 to an RF amplifier 40. The output of RF amplifier 40 is coupled over line 41 to antenna 28 for transmitting the received microwave signals to a receiver located in cab 18 as shown by arrow 31.

For proper operation of receiver 35, emissions from antenna 28 should be isolated from antenna 15. This may be provided by antenna design and placement on the rotor tip. Alternatively, receiver 35 may include a frequency multiplication or frequency shift to the amplified target reflected microwave signals so that emissions by antenna 28 do not interfere with receptions by antenna 15. A frequency shift may be provided by an oscillator and mixer.

Receiver and transmitter 36 includes an antenna 16 coupled over line 42 to a diplexer 43. The output of diplexer 43 is coupled over line 44 to the input of multiplier 45 which functions to multiply the pilot signal frequency by a predetermined constant such as 2. The output of multiplier 45 is coupled over line 46 to the input of RF amplifier 47. The output of RF amplifier 47 is coupled to an input of diplexer 43 which couples the output of amplifier 47 to antenna 16.

Cab elements 52 include receiver 53, pilot signal transmitter and receiver 54, transmitter 55, stable local oscillator 56, A/D converter 57, digital processor 58, scan converter 59, display 60 and system control 61. Receiver 53 includes antenna 29 coupled over line 62 to an input of RF amplifier 63. The output of RF amplifier 63 is coupled over line 64 to one input of mixer 65. A second input to mixer 65 is coupled over line 66 from stable local oscillator (STALO) 56. The output of mixer 65 is coupled over line 67 to an input of intermediate frequency amplifier 68 having an output coupled over line 69 to the input of mixer 70. Mixer 70 has a second input coupled over line 71 from stable local oscillator 56. The output of mixer 70 is coupled over line 72 to an input of A/D converter 57.

Receiver 53 functions to receive by means of antenna 29 target reflected signals relayed from receiver 35 by way of antenna 28. Compensation for a doppler frequency shift imposed on the signals received by antenna 29 due to the motion between antenna 28 and 29 is provided by the signal on line 66. The signal on line 71 functions to provide an output of receiver 53 at base line frequency.

A/D converter 57 functions to convert the analog data on line 72 to digital signals and to transfer them over line 73 to digital processor 58. Digital processor 58 functions to process the data on line 73 to provide an image of the area or map illuminated by the transmitted signals which is well known in the art and provide this data over line 74 to scan converter 59.

Scan converter 59 functions to store and convert the data from range and azimuth to a rectilinear representation in X and Y coordinates and to provide this data over line 75 to display 60. Display 60 functions to display the data provided on line 75 to provide useful information to an operator. Alternatively, scan converter 59 and display 60 may be another utilization device which may be able to utilize the data provided on line 74.

System control 61 functions to provide timing control such as to the transmitter 55 over line 50 and digital processor 58 over lines 51 which is well known in the art.

Transmitter and receiver 54 includes antenna 17 which may transmit a pilot signal such as at 1 gigahertz by antenna 17 and receive a pilot signal such as at 2 gigahertz from antenna 16. Antenna 17 is coupled over line 76 to diplexer 77 which receives a pilot signal from STALO 56 over line 78. Diplexer 77 provides the receiver pilot signal over line 79 to STALO 56.

Transmitter 55 includes a modulator 80 having an input coupled over line 81 from stable local oscillator 56, an input coupled over line 50 from system control and an output coupled over line 82 to an input of power amplifier 83. The output of power amplifier 83 is coupled over line 84 to antenna 19. Transmitter 55 functions to transmit a predetermined wavefrom at a predetermined frequency such as 16 gigahertz at predetermined times from antenna 19.

Stable local oscillator 56 functions to generate predetermined frequencies for the transmitter 55 and transmitter and receiver 54 and for receiver 53. Stable local oscillator 56 also functions to receive the received pilot signal on line 79 and to process the signal by mixing and multiplication to provide a doppler compensating signal on line 66 to mixer 65 of receiver 53.

Figure 4:
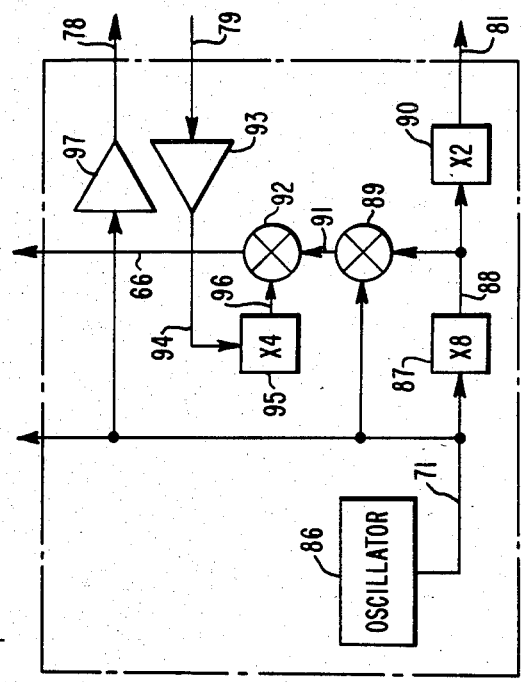
FIG. 4 is a schematic diagram of one embodiment of the oscillator shown in FIG. 3.

FIG. 4 is a schematic diagram of one embodiment of stable local oscillator 56 shown in FIG. 3. Oscillator 86 functions to provide a stable frequency at 1 gigahertz, for example, which is coupled over line 71 to an input of multiplier 87. Multiplier 87 functions to multiply the frequency of 1 gigahertz on line 71 by a predetermined constant such as 8 to provide a frequency of 8 gigahertz on line 88 to an input of mixer 89 and to an input of multiplier 90. Multiplier 90 functions to multiply the 8 gigahertz frequency on line 88 by a predetermined constant such as 2 to provide a 16 gigahertz signal at its output on line 81 which in turn is transmitted by transmitter 55 as shown in FIG. 3.

The 1 gigahertz signal on line 71 is also coupled to a second input of mixer 89 to provide an output on line 91 of the difference of the two input signals on lines 71 and 88 which is 7 gigahertz. The 7 gigahertz signal on line 91 is coupled to an input of mixer 92. The received pilot signal on line 79 is coupled through RF amplifier 93 having an output on line 94. Line 94 is coupled to an input of multiplier 95 which functions to multiply the frequency of the signal on line 94 by a predetermined constant such as four. The output of multiplier 95 is coupled over line 96 to an input of mixer 92. The summation of the frequencies of the two signals on lines 91 and 96 to mixer 92 are provided at the output of mixer 92 on line 66. As will be explained, line 66 contains a doppler frequency term arising from the round trip of the pilot signal which will be used to cancel out the one-way doppler frequency term of the relayed radar signals from receiver 35 to receiver 53.

The 1 gigahertz signal on line 71 is also coupled to an input of RF amplifier 97 having an output on line 78.

In operation of the bistatic radar configuration as shown in FIG. 3, STALO 56 provides a 16 gigahertz signal over line 81 to transmitter 55 which transmits by means of antenna 19 a signal having a predetermined beam width towards a target. Target reflected signals are received at the tip of rotor 12 by antenna 15 which amplifies the signals in receiver 35 and relays the signals by means of antennas 28 and 29 from the rotor tip antenna 28 to antenna 29 mounted on cab 18. The signal received at antenna 29 includes a doppler shift due to the relative motion between antennas 28 and 29 which is equal to the frequency which in this case is 16 gigahertz times the quantity $(1+V/C)$ gigahertz where V is the relative velocity between antennas 28 and 29 and C is the speed of light.

Figure 5:
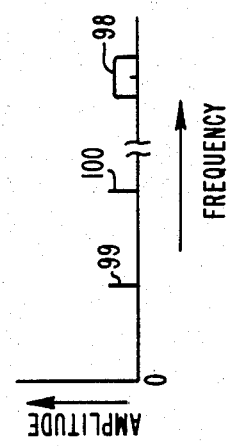
FIG. 5 is a graph showing the up link, down link and received radar signal frequencies.

FIG. 5 is a graph showing a curve 98 representative of the received target reflected signals which contain a doppler frequency shift due to transferring the target reflected signals from antenna 28 to antenna 29. In FIG. 5, the ordinate represents amplitude and the abscissa represents frequency in gigahertz. The relative motion between antennas 28 and 29 may approach Mach 1 in helicopter applications. A means to cancel the doppler frequency shifts imposed upon relaying target reflected signals from antenna 28 to antenna 29 can be done by transmitting an auxiliary reference signal or pilot signal to and from the rotor tip 12 and using the two-way doppler shift on the auxiliary or pilot signal to cancel the one-way doppler shift imposed on the target reflected signals received at rotor tip 12 and relayed by antenna 28 to antenna 29. Referring to FIGS. 3 and 4, a 1 gigahertz signal is generated by stable local oscillator 56 which is in phase lock with the transmitter frequency of 16 gigahertz and which is relayed by antenna 17 to antenna 16 at the rotor tip 12. Receiver and transmitter 36 multiplies the received 1 gigahertz signal to provide a 2 gigahertz signal which is relayed from antenna 16 to antenna 17. Referring to FIG. 5, the up link frequency as received by antenna 16 has a doppler frequency shift imposed thereon to provide a pilot signal of $(1+V/C)$ GHz as shown by curve 99. The received up link frequency is multiplied by a predetermined constant such as 2 and is retransmitted from antenna 16 to antenna 17 on the cab which adds another doppler frequency shift to the pilot signal frequency of $(1+V/C)$ resulting in a down link frequency of $2(1+V/C)^2$ GHz at antenna 17 and shown in FIG. 5 by curve 100.

Transmitter/receiver 54 provides this signal to stable local oscillator 56 wherein it is multiplied by four to provide $8+16 V/C+8 V^2/C^2$ on line 96. Mixer 92 adds a 7 gigahertz signal to the frequency of the signal on line 96 to provide on line 66 a signal having a frequency of $15+16 V/C+8 (V/C)^2$. Mixer 65 in receiver 53 functions to subtract this frequency term from the received target reflected signals by antenna 29 to provide a signal on line 67 of $1+8 (V/C)^2$ gigahertz. The doppler frequency shift term of $16 V/C$ has been removed and the doppler frequency shift term $8 (V/C)^2$ is a small second order term which remains. Mixer 70 functions to subtract 1 gigahertz frequency from the signal on line 67 or 69 to provide the base band frequencies of the target reflected signals plus the term 8 $(V/C)^2$ which is a second order term and relatively small.

Typical base line system parameters for operation of the embodiment in FIG. 3 is shown in Table 1 which would enable one skilled in the art to provide a useful rotor tip synthetic aperture radar.

TABLE I

Baseline System Parameters:

Operational

| | | |
|---|---|---|
| range resolution | $\delta R$ = | 20' & 50' |
| azimuth resolution | $\delta\theta$ = (20' at 1 nmi) = | 3.5 mrad |
| map generation time (single look) | = | $\frac{2}{3}$ sec | map modes
2 nmi swath selectable 0 to 5 nmi, 20' range resolution
0 to 5 nmi range, 50' range resolution
90° sector selectable over 360°

Mechanical

| | | |
|---|---|---|
| rotor length | $r$ = | 35' |
| rotor rate (3 Hz) | $\omega$ = | 20 rad/s |
| tip aperture | = | 1.5" × 1.5" |
| cab aperture | = | 1.5" × 15" |

Electrical

| | | |
|---|---|---|
| radar frequency | = | 16 GHz |
| average power | $P_{ave}$ = | 10 w |
| peak power | $P_{peak}$ = | 30 kw |
| pulse width | = | 40 ns |
| instantaneous bandwidth | $B$ = | 25 MHz |
| frequency multilooks | to be determined | |
| PRF | $f_{rep}$ = | 8 kHz |
| unambiguous range | $R_{max}$ = | 10 nmi |
| tip aperture beamwidths | = | 30° × 30° |
| cab aperture beamwidths | = | 30° × 3° (shaped) |
| tip aperture gain (no loss) | $G_r$ = | 21.6 dB |
| cab aperture gain (no loss) | $G_t$ = | 31.6 dB |
| dwell time | $T_{dwell}$ = | $BW_{az}/\omega$ = 25 ms |
| doppler bandwidth | $B_{dop}$ = | $2\omega r \sin(BW_{az}/2)/\lambda$ = 5.6 kHz |
| azimuth compression ratio | $N_{az}$ = | $B_{dop}T_{dwell}$ = 140 |
| synthetic aperture length | $L$ = | $2r\sin(BW_{az}/2)$ = 18' |

Processor & Display

| | | |
|---|---|---|
| oversampling (each dimension) | = | 50% |
| map samples (storage & display) | 900 × 750 = | 675 kwds |
| data rate (output) | = | 1 Mwd/s |
| computation rate (20 cops/sample) | = | 20 Mcops |

Baseline System S/N Calculation:

$$S = \frac{P_{ave}G_tG_r\lambda^2\sigma^o\delta r\delta\theta}{(4\pi)^3 R^3 (\text{losses})}$$

$$N = kT^o\overline{NF}\frac{1}{T_{dwell}}$$

S/N = 9.4 dB per look
$P_{ave}$ = 10. dBw
$G_t$ = 31.6 dB
$G_r$ = 21.6 dB
$\lambda^2$ = −24. dB(ft$^2$)
$\sigma^o$ = −15. dB
$\delta\theta\delta R$ = −11.5 dB(ft)
$(4\pi)^{-3}$ = −33. dB
$R^{-3}$ = −134.3 dB(ft$^{-3}$)
losses = −20. dB
S = −174.6 dBw
$kT^o$ = −204. dB(w/Hz)
$\overline{NF}$ = 4. dB
$\frac{1}{T_{dwell}}$ = 16. dB(Hz)
N = −184. dBw For a further description of synthetic aperture radar, reference is made to the following publications:

Research and Development Technical Report ECOM 0223-F "Synthetic Aperture Helicopter Radar Experimental Evaluation Program", Final Report by N. F. Powell Conduction Corporation, December 1970, Contract No. DAAB07-69-C-0223, U.S. Army Electronics Command, Fort Monmouth, N.J.;

Robert O. Harger *Synthetic Aperture Radar Systems: Theory and Design*, New York Academic Press 1970; and Merrill I. Skollnik, Edition *Radar Handbook*, Chapter 23, "Synthetic Aperture Radar", McGraw Hill Book Co. 1970.

The above references which describe synthetic aperture radar are incorporated herein by reference.

Figure 6:
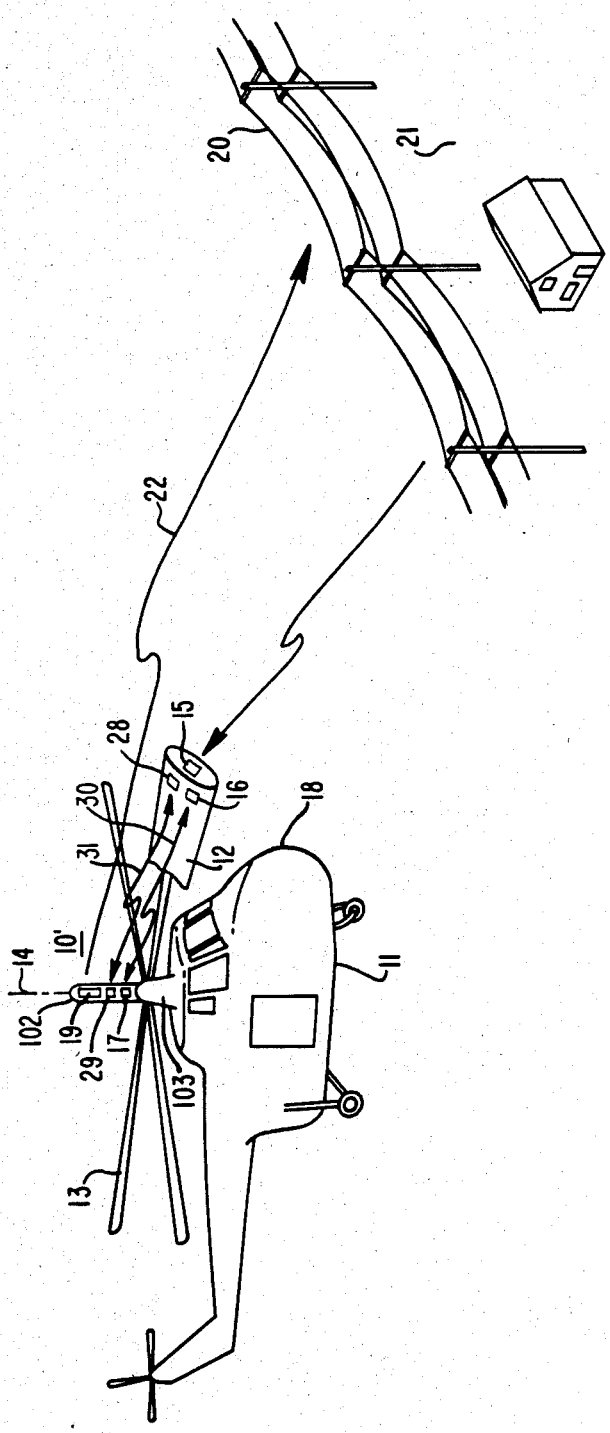
FIG. 6 is an alternate embodiment of a bistatic rotor tip synthetic aperture radar implemented on a helicopter.

FIG. 6 shows an alternate embodiment of the rotor tip synthetic aperture radar 10' implemented on a helicopter. In FIG. 6 like references are used for functions corresponding to the apparatus of FIGS. 1, 3 and 4. In FIG. 6 a mast 102 is shown above a hub 103. The hub 103 supports rotors 12 and 13 and also supports mast 102. Mast 102 contains antenna 19 and transmitter 55, transmitter/receiver 54, receiver 53, and stable local oscillator 56. While mast 102 rotates along with hub 103, transfer of electrical signals through the hub to the cab 18 may occur such as on line 72 shown in FIG. 3. Alternately, digital processor 58 and A/D converter 57 may also be located in the mast 102. With the output of the digital processor on line 74 being transferred to the cab 18 which would also contain the remaining elements such as scan converter 59 and display 60. The rotor tip elements 34 as shown in FIG. 3 would be located at the tip of rotor 12 as before.

A rotor tip synthetic aperture radar has been described comprising a rotor operable to rotate, and wherein a transmitter positioned in a spaced-apart second location transmits radar signals towards a target. Target reflected signals are received by a receiver in the rotor tip as the rotor tip traverses an arc. The target reflected signals from the rotor tip are relayed to the second location wherein a doppler frequency shift is imposed on the relayed signal. The imposed doppler frequency shift is removed by generating a pilot signal at the second location which is transmitted to the rotor tip and returned to the second location and processed to generate an appropriately scaled doppler frequency shift signal which may be subtracted from the relayed target reflected signals to remove the doppler frequency shift signal imposed on the target reflected signals.

I claim:

1. A rotor tip synthetic aperture radar comprising:
a rotor operable to rotate;
a first receiver positioned at a first location in said rotor for receiving target reflected microwave signals;
a transmitter positioned at a second location including means for generating and transmitting microwave signals towards a target;
said first receiver including means for amplifying said received microwave signals and for retransmitting said amplified microwave signals to a second receiver positioned at said second location;
said second receiver including means for extracting information from said amplified microwave signals;
first means for generating a pilot signal having a first predetermined frequency positioned at said second location and for transmitting said pilot signal to a second means positioned at said first location for receiving said pilot signal, multiplying its frequency and retransmitting said multiplied pilot signal to said second location;

third means at said second location for receiving and multiplying the frequency of said received pilot signal to provide a first signal;

fourth means for mixing said first signal with a second predetermined frequency to provide a second signal; and fifth means for mixing said second signal with said amplified microwave signals received by said second receiver to cancel first order doppler frequency shifts of said amplified microwave signals in passing from said first location to said second location.

2. The rotor tip synthetic aperture radar of claim 1 wherein said first means for generating a pilot signal includes means for generating a coherent pilot signal with respect to the transmitted microwave signals.

3. The rotor tip synthetic aperture radar of claim 1 wherein said second location is within the cab of a helicopter.

4. The rotor tip synthetic aperture radar of claim 1 wherein said second position is on a mast mounted on the hub which rotates and supports the rotor.

5. The rotor tip synthetic aperture radar of claim 1 wherein said first predetermined frequency is 1 GHz.

6. The rotor tip synthetic aperture radar of claim 1 wherein said multiplied pilot signal has a frequency of 2 GHz.

7. The rotor tip synthetic aperture radar of claim 1 wherein said transmitted microwave signals are at 16 GHz.

8. The synthetic aperture radar of claim 1 wherein said third means for receiving and multiplying includes multiplying by 4.

9. The synthetic aperture radar of claim 1 wherein said fourth means for mixing with a predetermined frequency includes mixing with a predetermined frequency of 7 GHz.

10. A bistatic synthetic aperture radar comprising:
a first receiver for receiving target reflected microwave signals;
a transmitter for generating and transmitting microwave signals towards a target;
said first receiver spaced apart from said transmitter at first and second locations respectively and including means for moving said first receiver at said first location with respect to said transmitter at said second location;

said first receiver including means for amplifying said received microwave signals and for retransmitting said amplified microwave signals to a second receiver positioned at said second location;

said second receiver including means for extracting information from said amplified microwave signals;

first means for generating a pilot signal having a first predetermined frequency positioned at said second location and for transmitting said pilot signal to a second means positioned at said first location for receiving said pilot signal, multiplying its frequency and retransmitting said multiplied pilot signal to said second location;

third means at said second location for receiving and multiplying the frequency of said received pilot signal to provide a first signal;

fourth means for mixing said first signal with a second predetermined frequency to provide a second signal; and fifth means for mixing said second signal with said amplified microwave signals received by said second receiver to cancel first order doppler frequency shifts of said amplified microwave signals in passing from said first location to said second location.

11. A helicopter rotor tip synthetic aperture radar system which provides compensation for doppler frequency signal shifts arising from relative movement between rotor tip mounted receiver means which receives target reflected radar signals, and helicopter mounted radar signal generation and transmitter means which are remote from the rotor tip, wherein relay transmission means are included at the rotor tip for relaying target reflected signals from the rotor tip to a relay receiver disposed on the helicopter remote from the rotor with a doppler frequency shift imposed on this relayed target reflected signal, and wherein pilot signal generating and transmitter/receiver means are disposed on the helicopter remote from the rotor, which pilot signal is of a predetermined frequency and is transmitted to and received at the rotor tip, with frequency multiplying means provided at the rotor tip for multiplying the pilot signal, which multiplied pilot signal is retransmitted back to the pilot signal receiver means remote from the rotor and mixed with a doppler frequency shift compensation signal to thereby cancel the doppler frequency shift signal.

* * * * *